United States Patent Office 2,867,888
Patented Jan. 13, 1959

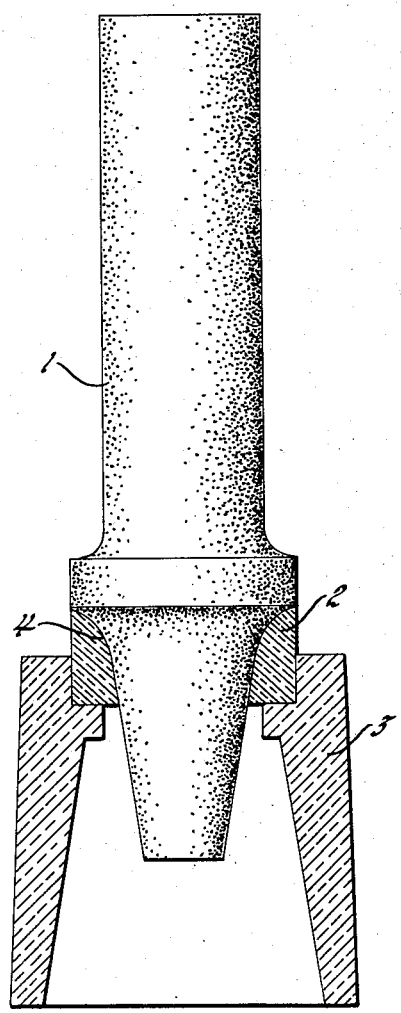

2,867,888

METHOD OF FIRING ALUMINA CERAMICS

Carl F. Schaefer, Flint, and Karl Schwartzwalder, Holly, Mich., assignors to General Motors Corporation, Detroit, Mich., a corporation of Delaware Application January 3, 1955, Serial No. 479,482

3 Claims. (Cl. 25—157)

This invention relates to the manufacture of ceramic articles such as insulators, crucibles, gauges, and the like and has particular reference to the firing operation used in the manufacture of formed ceramic articles which have a high alumina content and which, therefore, mature at high temperatures.

During recent years, it has become increasingly common practice to manufacture formed ceramic articles of sintered, high-alumina compositions such as are disclosed and claimed in United States Letters Patent No. 2,272,618 issued February 10, 1942, to Albra H. Fessler and Karl Schwartzwalder and assigned to the assignee of the present invention. Articles made of such compositions have extremely high heat and electrical resistance, good corrosion and wear resistance, high thermal shock resistance, as well as many other useful properties and thus have found wide application as spark plug insulators, crucibles, gauges and various other industrial ceramics. Such articles may be formed by any one of various methods. For example a raw batch of the high-alumina ceramic plus an organic resin or wax binder may be molded to form the desired shape and subsequently fired to burn out the binder and mature the ceramic. Another method consists of extruding the ceramic to form a blank and then turning or grinding to final shape prior to firing. Regardless of the precise method used for forming, an essential and usually the final step in the manufacture consists of a firing operation wherein the ceramic composition is brought to maturing temperature for a sufficient period to form a dense, non-porous body. The temperature and time required for this firing operation will, of course, depend on the precise composition of the ceramic. However, with the high-alumina type compositions to which this invention relates, the firing temperature required will always be very high, particularly for those compositions having an extremely high alumina content, i. e., in the neighborhood of 90% or higher. For example, an article made from a raw batch containing about 90% alumina, 5% clay, 4% talc, and 1% strontium carbonate, which, because of its high lead corrosion resistance, finds great utility as a spark plug insulator, requires a firing temperature of about 3100° to 3200° F.

During the firing operation, the formed ceramic article must, of course, be supported by a member having extremely high heat resistance because of the temperatures encountered. Heretofore it has been the practice to use as the ceramic support a composition of all alumina or of alumina plus silica, which provides the necessary high heat resistance to prevent deformation and sagging. There has been difficulty, however, with such support refractories in that they tend to bond to the high-alumina ceramic article being fired during said firing operation. Very frequently such supports become stuck to the article being manufactured to such an extent as to damage beyond repair both the article and the support. Even where the sticking is not so bad as to require scrapping of the work piece, destruction of the support results and a grinding or smoothing operation is necessary to finish the surface of the work piece which was in contact with the support during the firing operation. Thus the cost of manufacture is greatly increased.

An object of the present invention is the provision of a ceramic setter member to support the high-alumina work piece during the firing operation which will resist softening and deformation and which will also resist bonding to the work piece during said operation. A further object of the invention is to provide a ceramic setter member for use in the firing of high-alumina ceramics which will greatly reduce the cost of said operation and improve the quality of the articles manufactured. In accordance with the invention, the setter member consists of a sintered mass containing about 80% to 90% alumina and the balance substantially all zirconia. It is highly advantageous that the composition be free of silica since the presence of silica has been found to not only increase the tendency to deform during firing, but also to cause the undesirable bonding of the setter to the article it supports.

By the term setter member, as used herein, is meant the support or portion of the support which comes into direct contact with the work piece or, in other words, the support member or portion of the support member on which the work piece sets.

The following detailed description of the invention and the drawing are with reference to the manufacture of spark plug insulators. It is to be understood, however, that the invention is not restricted to the manufacture of insulators, such reference being by way of illustration rather than limitation.

In the drawing, 1 is a spark plug insulator formed of a high-alumina composition such, for example, as the raw batch formula heretofore set forth. The insulator 1 is supported during the firing operation by setter member 2 which in turn is supported by a refractory bar 3 of any composition having sufficient heat resistance to prevent softening and deformation under the heat to which it is exposed. In the embodiment shown, the setter member 2 is in the form of a ring having an annular surface 4 which contacts the insulator member. The most advantageous shape for the setter member will of course be determined by the shape of the work piece for which it is designed to serve as a support.

In accordance with the invention, setter member 2 is formed of a sintered mixture of alumina and zirconia, the zirconia content being not greater than about 20% and not less than about 10%. Particularly advantageous is a sintered composition containing 90% alumina and 10% zirconia. If the zirconia content is less than about 10%, it has been found that sticking occurs between the insulators and the setter members during the firing operation. Where more than 20% zirconia is included in the composition, the heat resistance is greatly reduced, thereby causing softening and deformation as well as sticking during the firing.

Special advantages may be gained by using a composition in which the grain size of substantially all the alumina is less than about 100 mesh. The use of such fine grain alumina assures a smooth contacting surface on the setter member, thus precluding the possibility that the insulator surface with which it is in contact will become roughened or marred during firing. The preponderance of the zirconia used in the raw batch preferably should have a grain size of about 325 mesh or less. A preferred composition consists of 70% alumina Al4 (relatively fine crystalline calcined alumina, grain size predominantly 325 mesh and finer), 20% alumina AlO (relatively coarse crystalline calcined alumina, grain size predominantly 100 mesh and finer) and 10% 325 mesh zirconia. The screen analysis of this preferred raw batch composition is as follows:

Alumina A14—Substantially all —325 mesh.

Alumina AlO:

| Mesh | Percent |
|---|---|
| +40 mesh | .17 |
| —40 +65 mesh | .63 |
| —65 +100 mesh | 3.70 |
| —100 +150 mesh | 10.69 |
| —150 +200 mesh | 25.86 |
| —200 +325 mesh | 37.25 |
| —325 mesh | 20.63 |

Zirconia—Substantially all —325 mesh.

The setter members may be made by mixing with the raw batch of alumina and zirconia a small amount, about from 5% to 10%, of wax binder, pressing in a die to form the desired shape and then firing to burn out the binder and sinter the ceramic to a dense, non-porous mass. There is, of course, some shrinkage (approximately 10%) during the firing and thus the forms pressed from the wax bonded alumina-zirconia mix must be larger than the desired setter. The firing of the setters should be at or above the temperature at which they will subsequently be used, the most advantageous temperature depending on the precise composition. For the preferred composition of 70% A14 alumina, 20% AlO alumina and 10% zirconia, the best firing temperature is about 3200° F.

Because there is no sticking or deformation during firing of the ceramic articles being manufactured, the setters may of course be used over and over again. By means of the invention, the cost of manufacture is lowered, scrap is reduced and the quality of the ceramic items manufactured may be improved.

It is to be understood that, although the invention has been described with specific reference to particular embodiments thereof, it is not to be so limited since changes and alterations therein may be made which are within the full intended scope of this invention as defined by the appended claims.

What is claimed is:

1. A method for firing a ceramic body of the type containing at least about 90% alumina and requiring a firing temperature on the order of at least about 3100° F., said method comprising the steps of supporting said body on a sintered mass consisting essentially of from 80% to 90% alumina and the balance zirconia, substantially all of the alumina in said mass having a grain size prior to sintering not greater than 100 mesh, and firing said body while so supported.

2. A method for firing a ceramic body of the type containing at least about 90% alumina and requiring a firing temperature on the order of at least about 3100° F., said method comprising the steps of supporting said body on a sintered mass consisting essentially of from 80% to 90% alumina and the balance zirconia, at least 70% of the alumina in said mass having a grain size prior to sintering of 325 mesh and finer, and firing said body while so supported.

3. A method for firing a ceramic body of the type containing at least about 90% alumina and requiring a firing temperature on the order of at least about 3100° F., said method comprising the steps of supporting said body on a sintered mass consisting essentially of about 90% alumina and about 10% zirconia, at least 70% of the alumina in said mass having a grain size prior to sintering of 325 mesh and finer, and firing said body while so supported.

References Cited in the file of this patent
UNITED STATES PATENTS

| | | |
|---|---|---|
| 1,362,316 | Hutchins | Dec. 14, 1920 |
| 2,496,078 | Wentworth | Jan. 31, 1950 |

FOREIGN PATENTS

| | | |
|---|---|---|
| 340,376 | Great Britain | Jan. 1, 1931 |
| 759,029 | France | 1933 |
| 571,092 | Great Britain | Aug. 7, 1945 |
| 684,980 | Great Britain | Dec. 31, 1952 |